W. H. PITTMAN.
NUT LOCK.
APPLICATION FILED MAY 2, 1917.

1,257,022.

Patented Feb. 19, 1918.

WITNESSES

INVENTOR
William H. Pittman.
BY
ATTORNEY

UNITED STATES PATENT OFFICE.

WILLIAM H. PITTMAN, OF MINATARE, NEBRASKA.

NUT-LOCK.

1,257,022.　　　　Specification of Letters Patent.　　Patented Feb. 19, 1918.

Application filed May 2, 1917. Serial No. 165,953.

*To all whom it may concern:*

Be it known that I, WILLIAM H. PITTMAN, a citizen of the United States, residing at Minatare, in the county of Scotts Bluff and State of Nebraska, have invented certain new and useful Improvements in Nut-Locks, of which the following is a specification.

This invention relates to nut locks.

One of the main objects of the invention is to provide a nut lock of simple construction and operation composed of a minimum of parts in which the nut used may be of standard construction being entirely free of all grooves, slots, and similar devices commonly used in many forms of nut locks. A further object is to provide a nut lock comprising broadly a bolt having a groove extending substantially the full length of the threaded portion of the bolt, a nut threaded on the bolt, and a locking member mounted in this groove and bent about the nut so as to prevent rotation of the same. A still further object is to provide means whereby the locking member may be secured against rotation and the inner end of this member may also be so secured as to prevent disengagement of the same with the body or the stem of the bolt so as to eliminate all possibility of this locking member moving outward of the bolt so as to release the nut. Further objects will appear from the detailed description.

In the drawings:—

Figure 1:
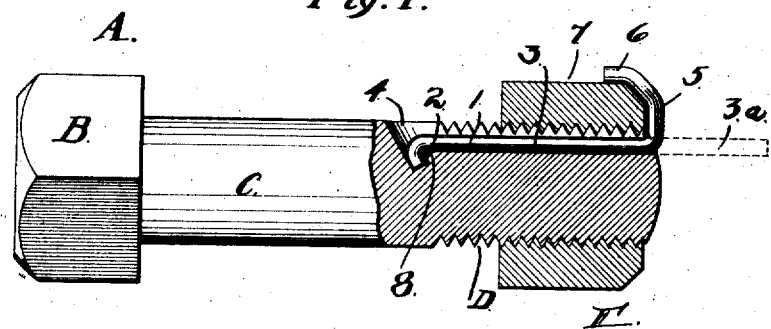
Figure 1 is a side view of a nut lock constructed in accordance with my invention, partly in section.
Figure 2:
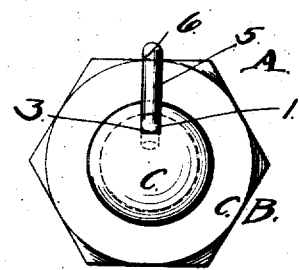
Fig. 2 is an end view of the nut lock taken from the threaded end of the bolt.

The bolt A is provided with the usual head B, and stem or body C, the end portion D of this stem being threaded in the usual manner to receive the hexagonal nut E of standard construction. The stem C of the bolt is provided with a longitudinally extending groove 1, this groove extending the full length of the threaded portion D. Groove 1 is contiguous to a recess 4 provided in the stem of the bolt and disposed at an angle to the groove. As will be noted more clearly from Fig. 1 of the drawings, the recess 4 is straight and is disposed at a downward and forward inclination to the axis of stem C of the bolt so as to permit ready insertion or removal of the finger 2 when the locking member 3 is placed in operative position. As will be noted from Fig. 1 of the drawings, recess 4 is disposed at an acute angle to the groove, being inclined downward and toward the threaded portion of the bolt.

The groove 1 is adapted to receive a locking member 3. This member may be formed from a heavy piece of wire, or a steel rod may be utilized. The inner end of member 3 is bent at an acute angle to provide the offset or finger 2. This finger is adapted to fit snugly into the recess 4 when member 3 is in proper position in groove 1, thus locking this member against rotation, as shown.

In using this lock, locking member 3 is first placed in the groove 1 so as to extend beyond the end of stem C of the bolt as at 3*. In this position the body portion of member 3 is positioned within the periphery of stem C of the bolt so that the projecting portion 3* will fit through the nut E thus permitting the same to be threaded onto the bolt in the usual manner. After the nut has been threaded onto the bolt to the extent desired, the outer projecting portion 3* of member 3 is bent outward and over about the outer face of the nut E as at 5, and is then bent inward at an angle so as to form a finger 6 which projects downward in front of one of the six side-faces 7 of the hexagonal nut in close contact therewith. When the locking member has been bent in this manner the finger 6 positively prevents rotary movement of the nut relative to the stem of the bolt, as will be obvious.

As will be noted from Fig. 1 of the drawings, the finger 2 at the inner end of locking member 3 engages beneath the angularly disposed shoulder 8 intermediate the groove 1 and recess 4. For this reason outward movement of the inner end of member 3 radially of the stem C of the bolt is positively prevented. This eliminates all possibility of the inner end of the locking member becoming accidentally disengaged from recess 2 so as to permit outward movement of the locking member thus permitting rotation of the nut. In addition, this shoulder 8 prevents the inner end of the locking member from being moved out of operative position by any unauthorized person, as could be done if the finger 4 were not disposed at an angle to the body of this member, thus rendering it necessary to bend the portion 5 and finger of this member to release the nut. As any bending of this part of the locking member sufficient to release the nut would be readily noticed by a person glancing at or inspecting the nut lock, this securing of the inner end of the locking member against outward movement radially of the stem C of the bolt serves, in this manner, as a safe-guard against unauthorized persons tampering with the nut lock. By constructing my nut lock in this manner a bolt and nut of standard construction may be used, the only requirement being that the bolt be provided with a suitable groove and a recess. The locking member may be formed from heavy wire or steel rods cut into suitable length and may, for this reason, be produced at very small cost. This nut lock is composed of a minimum of parts, all of these parts, with the exception of the locking member being of standard construction and may, therefore, be quickly and cheaply made.

What I claim is:—

In nut locks, a bolt provided with a longitudinally extending groove in the threaded portion of its stem and a straight recess contiguous to the inner end of said groove, said recess being disposed at a forward and downward inclination to the axis of the stem of said bolt, a nut threaded on the bolt, and a locking member mounted in said groove provided at its inner end with an angularly disposed finger engaging into said recess, said locking member extending through the nut and being bent over and about the same so as to engage one of the lateral faces of the nut and prevent rotation thereof relative to said bolt.

In testimony whereof I affix my signature in presence of two witnesses.

WILLIAM H. PITTMAN.

Witnesses:
R. J. HARSHMAN,
R. G. MAYNARD.